United States Patent
Yanai

(10) Patent No.: US 10,670,921 B2
(45) Date of Patent: Jun. 2, 2020

(54) VIEWING ANGLE CONTROL FILM AND IMAGE DISPLAY DEVICE

(71) Applicant: FUJIFILM Corporation, Tokyo (JP)

(72) Inventor: Yujiro Yanai, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/185,454

(22) Filed: Nov. 9, 2018

(65) Prior Publication Data

US 2019/0094626 A1 Mar. 28, 2019

Related U.S. Application Data

(63) Continuation of application No. PCT/JP2017/014266, filed on Apr. 5, 2017.

(30) Foreign Application Priority Data

Jun. 2, 2016 (JP) ................................ 2016-110776

(51) Int. Cl.
*G02F 1/13363* (2006.01)
*G02F 1/1335* (2006.01)
(Continued)

(52) U.S. Cl.
CPC ......... *G02F 1/133634* (2013.01); *G02B 5/30* (2013.01); *G02B 5/3008* (2013.01);
(Continued)

(58) Field of Classification Search
CPC ......... G02F 1/133634; G02F 1/133509; G02F 1/13363; G02F 1/116; G02F 1/133528;
(Continued)

(56) References Cited

U.S. PATENT DOCUMENTS

2010/0014029 A1* 1/2010 Nakamura ........... G02B 5/3016
  349/74
2010/0265433 A1* 10/2010 Hoshi .................. G02B 5/3083
  349/62
(Continued)

FOREIGN PATENT DOCUMENTS

JP  2008-275976 A  11/2008
JP  2014-235397 A  12/2014
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2017/014266, dated Dec. 13, 2018, with English translation of the Written Opinion.

(Continued)

*Primary Examiner* — Shan Liu
(74) *Attorney, Agent, or Firm* — Birch, Stewart, Kolasch & Birch, LLP

(57) ABSTRACT

A viewing angle control film includes, in order, a first polarizer in which an absorption axis is in a direction perpendicular to a film surface; a first phase difference plate which is a λ/4 plate and has a patterned optical anisotropic layer; and a second phase difference plate which is a λ/4 plate and has a patterned optical anisotropic layer, in which the patterned optical anisotropic layers have a constant phase difference and are divided into a plurality of belt-like regions in the same plane, directions of slow axes in one belt-like region match each other and directions of slow axes of belt-like regions adjacent to each other are different from each other in the patterned optical anisotropic layer, and the belt-like region of the first phase difference plate and the belt-like region of the second phase difference plate are (Continued)

disposed so as to intersect with each other in a plane direction.

13 Claims, 4 Drawing Sheets

(51) Int. Cl.
  *G02B 5/30* (2006.01)
  *G02F 1/11* (2006.01)
(52) U.S. Cl.
  CPC .......... *G02F 1/116* (2013.01); *G02F 1/13363* (2013.01); *G02F 1/133509* (2013.01); *G02F 1/133528* (2013.01); *G02F 2001/133631* (2013.01); *G02F 2001/133633* (2013.01)
(58) Field of Classification Search
  CPC ........ G02F 2001/133633; G02F 2001/133631; G02F 1/0063; G02F 1/0131; G02F 1/1395; G02F 2001/0151; G02F 2001/13356; G02F 2001/133562; G02F 2001/133565; G02F 2001/133567; G02F 2202/40; G02F 2413/00; G02F 2413/11; G02F 2413/12; G02F 2413/14; G02F 2413/08; G02F 1/0311; G02F 1/1335; G02F 1/133536; G02F 1/13362; G02F 1/133533; G02F 2001/133531; G02F 2001/133521; G02F 2001/133538; G02F 2001/133541; G02F 2001/133543; G02F 2001/133545; G02F 2001/133548; G02F 2001/13355; G02F 2203/16; G02B 5/30; G02B 5/3008; G02B 5/3033; G02B 6/0056; G02B 6/02109; B29D 11/00644; B32B 17/10458; B32B 2307/42; H01L 51/5293; H01R 12/7005; H04B 10/532; G01J 5/0825; G03F 9/7065; G01R 33/3678; C09K 19/0208
  USPC .................................. 349/117–121, 96–103
  See application file for complete search history.

(56) References Cited

U.S. PATENT DOCUMENTS

| | | | |
|---|---|---|---|
| 2012/0287379 A1* | 11/2012 | Koike | G02F 1/133528 349/96 |
| 2014/0016081 A1* | 1/2014 | Kakubari | G02B 5/3016 349/201 |
| 2014/0268002 A1* | 9/2014 | Inomata | G02B 5/3016 349/194 |
| 2015/0177435 A1* | 6/2015 | Kim | G02B 27/26 349/194 |
| 2018/0172889 A1* | 6/2018 | Yanai | B32B 7/02 |
| 2019/0041270 A1* | 2/2019 | Yanai | G01N 21/21 |

FOREIGN PATENT DOCUMENTS

| | | |
|---|---|---|
| JP | 2016-1213 A | 1/2016 |
| WO | WO 2010/044414 A1 | 4/2010 |

OTHER PUBLICATIONS

International Search Report (form PCT/ISA/210) for International Application No. PCT/JP2017/014266 dated Jul. 4, 2017, with English Translation.

* cited by examiner

VIEWING ANGLE CONTROL FILM AND IMAGE DISPLAY DEVICE

CROSS-REFERENCE TO RELATED APPLICATIONS

This application is a Continuation of PCT International Application No. PCT/JP2017/014266, filed on Apr. 5, 2017, which claims priority under 35 U.S.C. § 119(a) to Japanese Patent Application No. 2016-110776, filed on Jun. 2, 2016. Each of the above application(s) is hereby expressly incorporated by reference, in its entirety, into the present application.

BACKGROUND OF THE INVENTION

1. Field of the Invention

The present invention relates to a viewing angle control film and an image display device obtained by using this viewing angle control film.

2. Description of the Related Art

In personal electronic devices, for example, tablet personal computers (PCs), notebook PCs, and mobile phones such as smartphones, there is a demand that users do not want their screens to be peeped by the surrounding third parties. Therefore, in these electronic devices, it has been attempted to narrow the viewing angle of a screen such that the surrounding third parties cannot peep at the screen.

For example, an emission direction (viewing angle) of video light is controlled by bonding a louver film (a so-called peep-preventing film) for narrowing the viewing angle of a screen to the front surface of a display (for example, see JP2014-235397A).

A louver film includes a louver layer formed by arranging fine microlouvers at predetermined intervals. Light which is incident in a direction perpendicular to the surface of such a louver film is transmitted through a gap between microlouvers. In addition, light which is incident in an arrangement direction of microlouvers, in other words, in an oblique direction with respect to the surface of the louver film is blocked by microlouvers.

Accordingly, by bonding the louver film to the front surface of a display, the screen can be viewed from the front side and the viewing angle of the screen can be narrowed such that the screen cannot be viewed in an oblique direction.

Further, JP2008-275976A describes a composite polarizing plate obtained by laminating a vertically polarizing film in which an absorption axis of a polarizer is aligned substantially perpendicularly to the film surface and a horizontally polarizing film in which an absorption axis of a polarizer is aligned in a substantially horizontal direction with respect to the film surface.

This composite polarizing plate is capable of effectively reduce the quantity of incidence light from an oblique upper and lower direction. Therefore, the composite polarizing plate is capable of narrowing the viewing angle of a screen using specific two oblique directions of the viewing angle as light shielding areas by only being placed on a screen of a plasma display or liquid crystal display.

SUMMARY OF THE INVENTION

However, since a louver film of the related art physically blocks light using arrangement of microlouvers, even in a case where light is incident perpendicularly to the louver film, the light is transmitted through a gap between microlouvers and is blocked at a position of the microlouvers. Therefore, there is a problem in that the brightness of a screen in the front direction is also degraded.

Further, in a configuration provided with one louver layer formed by arranging microlouvers in one direction, the viewing angle can be narrowed in the arrangement direction of the microlouvers, but the viewing angle does not change in a direction orthogonal to the arrangement direction. Accordingly, in order to narrow the viewing angle in all directions of 360°, a plurality of louver layers are laminated by differentiating the arrangement directions of microlouvers. However, the lamination of a plurality of louver layers results in a problem of further degradation of the brightness of a screen in the front direction.

In addition, a composite polarizing plate formed by combining a vertically polarizing film in which an absorption axis of a polarizer is aligned substantially perpendicularly to the film surface and a horizontally polarizing film in which an absorption axis of a polarizer is aligned in a substantially horizontal direction with respect to the film surface is capable of narrowing the viewing angle in a specific direction, but it was not considered to narrow the viewing angle in all directions of 360°.

An object of the present invention is to solve the problems of the related art and to provide a viewing angle control film which is capable of narrowing a viewing angle in all directions of 360° and suppressing degradation of brightness in a front direction; and an image display device obtained by using this viewing angle control film.

As the result of intensive examination conducted by the present inventors in order to achieve the above-described object, it was found that the above-described problems can be solved by providing a viewing angle control film including, in order: a first polarizer in which an absorption axis is in a direction perpendicular to a film surface; a first phase difference plate which is a λ/4 plate and has a patterned optical anisotropic layer; and a second phase difference plate which is a λ/4 plate and has a patterned optical anisotropic layer, in which the patterned optical anisotropic layer of the first phase difference plate and the patterned optical anisotropic layer of the second phase difference plate each have a constant phase difference and are divided into a plurality of belt-like regions in the same plane, directions of slow axes of one belt-like region match each other and directions of slow axes of belt-like regions adjacent to each other are different from each other in each of the patterned optical anisotropic layer of the first phase difference plate and the patterned optical anisotropic layer of the second phase difference plate, and the belt-like region of the patterned optical anisotropic layer of the first phase difference plate and the belt-like region of the patterned optical anisotropic layer of the second phase difference plate are disposed so as to intersect with each other in a plane direction.

In other words, it was found that the above-described object can be achieved by employing the following configurations.

[1] A viewing angle control film comprising, in order: a first polarizer in which an absorption axis is in a direction perpendicular to a film surface; a first phase difference plate which is a λ/4 plate and has a patterned optical anisotropic layer; and a second phase difference plate which is a λ/4 plate and has a patterned optical anisotropic layer, in which the patterned optical anisotropic layer of the first phase difference plate and the patterned optical anisotropic layer of the second phase difference plate each have a constant phase difference and are divided into a plurality of belt-like regions in the same plane, directions of slow axes in one belt-like region match each other and directions of slow axes of belt-like regions adjacent to each other are different from each other in each of the patterned optical anisotropic layer of the first phase difference plate and the patterned optical anisotropic layer of the second phase difference plate, and the belt-like region of the patterned optical anisotropic layer of the first phase difference plate and the belt-like region of the patterned optical anisotropic layer of the second phase difference plate are disposed so as to intersect with each other in a plane direction.

[2] The viewing angle control film according to [1], in which, in each of the patterned optical anisotropic layer of the first phase difference plate and the patterned optical anisotropic layer of the second phase difference plate, the directions of the slow axes of the belt-like regions adjacent to each other are orthogonal to each other.

[3] The viewing angle control film according to [1] or [2], in which the belt-like region of the patterned optical anisotropic layer of the first phase difference plate and the belt-like region of the patterned optical anisotropic layer of the second phase difference plate are orthogonal to each other in the plane direction.

[4] The viewing angle control film according to any one of [1] to [3], in which the patterned optical anisotropic layer of the first phase difference plate and the patterned optical anisotropic layer of the second phase difference plate contain a rod-like liquid crystalline compound or a discotic liquid crystalline compound.

[5] The viewing angle control film according to any one of [1] to [4], in which wavelength characteristics of the patterned optical anisotropic layer of the first phase difference plate and the patterned optical anisotropic layer of the second phase difference plate are inverse dispersion.

[6] The viewing angle control film according to any one of [1] to [5], in which the first polarizer has a birefringent material, the birefringent material is a liquid crystalline compound, and the viewing angle control film has a structure in which the liquid crystalline compound is vertically aligned.

[7] The viewing angle control film according to [6], in which the first polarizer has a dichroic coloring material.

[8] The viewing angle control film according to any one of [1] to [7], in which a width of the belt-like region of the patterned optical anisotropic layer of the first phase difference plate and a width of the belt-like region of the patterned optical anisotropic layer of the second phase difference plate are each in a range of 1 mm to 100 mm.

[9] An image display device comprising: an image display element which includes a second polarizer in which an absorption axis is in a horizontal direction with respect to a film surface; and the viewing angle control film according to any one of [1] to [8], in which the viewing angle control film is disposed such that the second phase difference plate side faces the image display element.

According to the present invention, it is possible to provide a viewing angle control film which is capable of narrowing a viewing angle in all directions of 360° and suppressing degradation of brightness in a front direction, and an image display device obtained by using this viewing angle control film.

DESCRIPTION OF THE PREFERRED EMBODIMENTS

Figure 1:
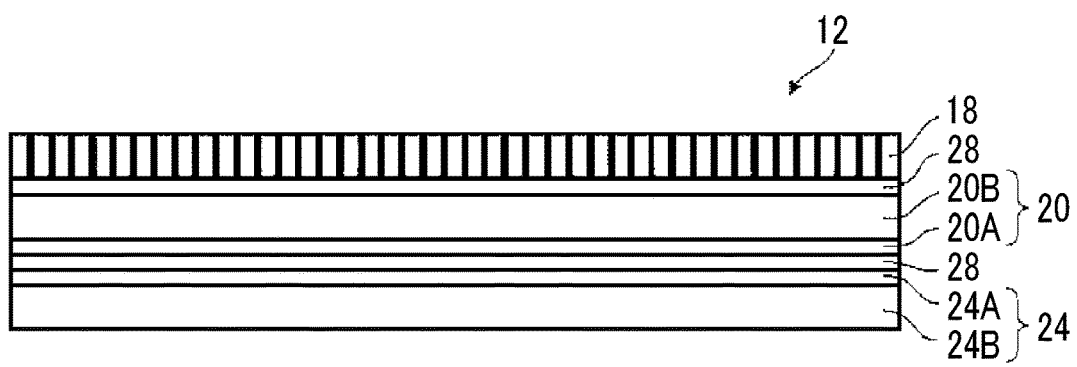
FIG. 1 is a side view conceptually illustrating an example of a viewing angle control film of the present invention.

Hereinafter, a viewing angle control film and an image display device according to an embodiment of the present invention will be described in detail based on preferred embodiments illustrated in the accompanying drawings.

Further, the numerical ranges shown using "to" in the present specification indicate ranges including the numerical values described before and after "to" as the lower limits and the upper limits.

Further, in the present specification, the terms "orthogonal" and "parallel" include an error range acceptable in the technical field to which the present invention belongs. For example, the terms "orthogonal" and "parallel" include an error range of less than ±10° with respect to the exact orthogonality or parallelism, and the error with respect to the exact orthogonality or parallelism is preferably 5° or less and more preferably 3° or less.

Further, angles other than the "orthogonal" and "parallel", for example, specific angles such as 15° or 45° also include the error range acceptable in the technical field to which the present invention belongs. For example, in the present invention, an angle includes an error range of less than ±5° with respect to the exact angle specifically shown, and the error with respect to the exact angle is preferably ±3° or less and more preferably ±1° or less.

In the present specification, Re ($\lambda$) and Rth ($\lambda$) each represent an in-plane retardation at a wavelength $\lambda$ and a retardation in a thickness direction. The wavelength $\lambda$ is set to 550 nm unless otherwise specified.

In the present specification, Re ($\lambda$) and Rth ($\lambda$) each represent a value measured at the wavelength $\lambda$ using AxoScan OPMF-1 (manufactured by OPTO SCIENCE, INC.). A slow axis direction (°) is calculated by inputting an average refractive index $((N_x+N_y+N_z)/3)$ and a film thickness (d ($\mu$m)) in AxoScan based on "Re ($\lambda$)=R0 ($\lambda$)" and Rth ($\lambda$)=$((N_x+N_y)/2-N_z) \times$ d.

In addition, R0 ($\lambda$) represents a numerical value calculated by AxoScan and indicates Re ($\lambda$).

In the present specification, the refractive indices $N_x$, $N_y$, and $N_z$ are measured using an Abbe refractometer (NAR-4T, manufactured by ATAGO CO., LTD.) and a sodium lamp ($\lambda$=589 nm) as a light source. Further, wavelength dependence can be measured in combination with an interference filter using a multi-wavelength Abbe refractometer DR-M2 (manufactured by ATAGO CO., LTD.).

Further, the catalog values of Polymer Handbook (JOHN WILEY & SONS, INC) and various optical films can also be used. The values of the average refractive indices of main optical films are as follows.

Cellulose acylate (1.48), cycloolefin polymer (1.52), polycarbonate (1.59), polymethyl methacrylate (1.49), and polystyrene (1.59)

A viewing angle control film according to an embodiment of the present invention includes, in order, a first polarizer in which an absorption axis is in a direction perpendicular to a film surface; a first phase difference plate which is a λ/4 plate and has a patterned optical anisotropic layer; and a second phase difference plate which is a λ/4 plate and has a patterned optical anisotropic layer, in which the patterned optical anisotropic layer of the first phase difference plate and the patterned optical anisotropic layer of the second phase difference plate each have a constant phase difference and are divided into a plurality of belt-like regions in the same plane, directions of slow axes in one belt-like region match each other and directions of slow axes of belt-like regions adjacent to each other are different from each other in each of the patterned optical anisotropic layer of the first phase difference plate and the patterned optical anisotropic layer of the second phase difference plate, and the belt-like region of the patterned optical anisotropic layer of the first phase difference plate and the belt-like region of the patterned optical anisotropic layer of the second phase difference plate are disposed so as to intersect with each other in a plane direction.

Figure 2:
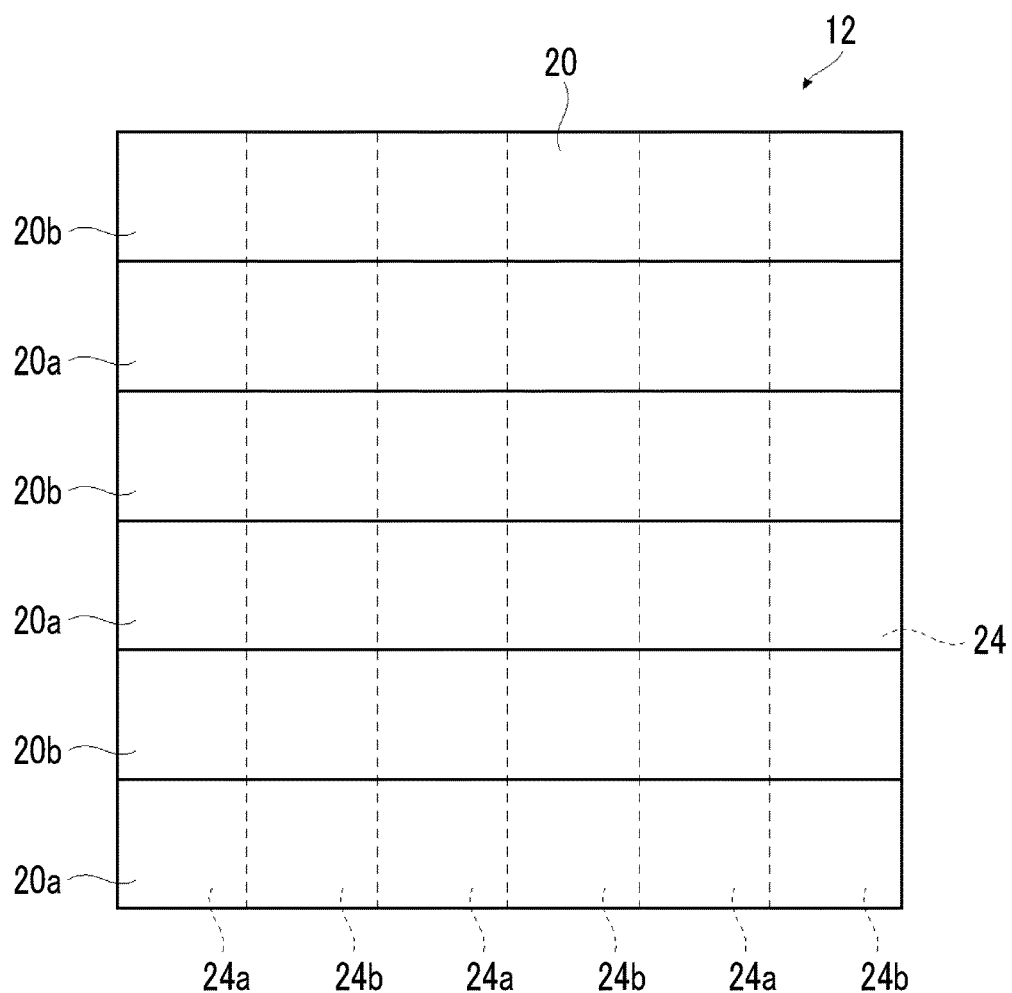
FIG. 2 is a front view of FIG. 1.

FIG. 1 is a side view conceptually illustrating an example of the viewing angle control film according to the embodiment of the present invention. FIG. 2 is a front view illustrating the viewing angle control film of FIG. 1.

A viewing angle control film 12 illustrated in FIG. 1 and FIG. 2 basically includes a first polarizer 18, a first phase difference plate 20, and a second phase difference plate 24 in this order. In FIG. 2, the first polarizer 18 is not illustrated for the sake of explanation. Further, in FIG. 1, absorption axes in the first polarizer 18 are schematically illustrated by thick lines.

Further, the front view is a view at the time of viewing the viewing angle control film 12 in a direction perpendicular to the main surface of the film.

As illustrated in FIG. 1, the viewing angle control film 12 has a configuration in which the first polarizer 18, the first phase difference plate 20, and the second phase difference plate 24 are laminated in this order and bonded to one another using a bonding layer 28.

In the example illustrated in the figures, the first polarizer 18 is a polarizer in which the absorption axes are in a direction perpendicular to the film surface. Further, the first phase difference plate 20 is a λ/4 plate including a patterned optical anisotropic layer 20A and a support 20B. The second phase difference plate 24 is a λ/4 plate including a patterned optical anisotropic layer 24A and a support 24B.

Further, the first phase difference plate 20 may not include the support 20B depending on the material for forming the patterned optical anisotropic layer 20A. Similarly, the second phase difference plate 24 may not include the support 24B depending on the material for forming the patterned optical anisotropic layer 24A. In addition, the first polarizer 18 may include a support. Alternatively, the bonding layer 28 is not provided between the first polarizer 18 and the first phase difference plate 20, and the first polarizer 18 may be directly formed on the first phase difference plate 20.

The bonding layer 28 is used for bonding the first polarizer 18 and the first phase difference plate 20 and bonding the first phase difference plate 20 and the second phase difference plate 24.

Layers formed of various known materials can be used as the bonding layer 28 as long as the bonding layer is used for bonding a target plate-like material (sheet-like material). Examples thereof include a layer formed of an adhesive, which has fluidity at the time of bonding and becomes a solid; a layer formed of a pressure sensitive adhesive, which is a gel-like (rubber-like) soft solid at the time of bonding and in which the gel-like state does not change after bonding; and a layer formed of a material having characteristics of an adhesive and a pressure sensitive adhesive. Therefore, known materials used for bonding sheet-like materials in optical devices and optical elements, such as an optically transparent adhesive (optical clear adhesive (OCA)), an optical transparent double-sided tape, or an ultraviolet curable resin, may be used as the bonding layer 28.

Alternatively, the optical laminated film of the present invention may be configured by laminating the first polarizer 18, the first phase difference plate 20, and the second phase difference plate 24 and holding these with a frame or a holding device without bonding these using the bonding layer 28.

Figure 3:
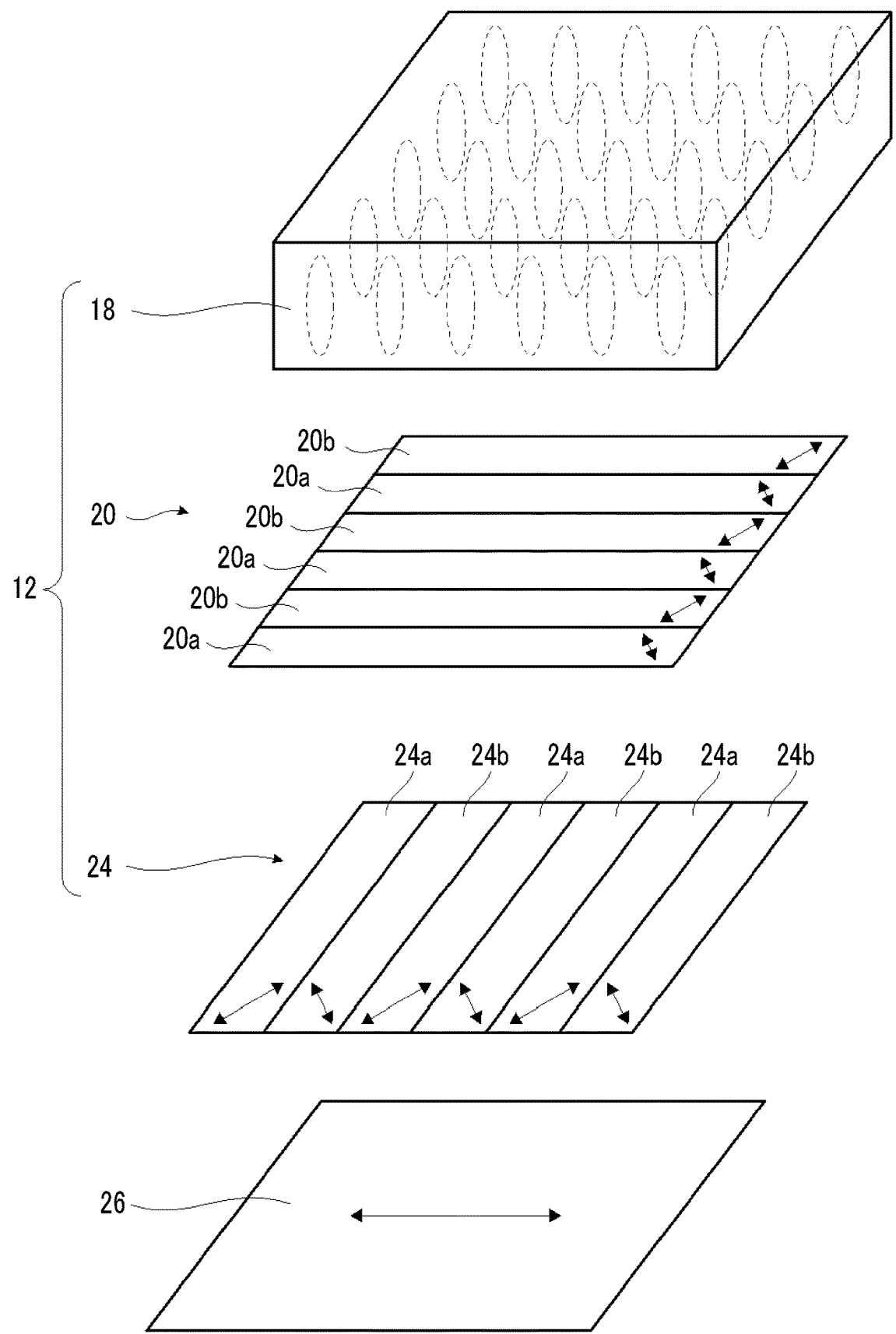
FIG. 3 is a conceptual view illustrating the viewing angle control film of FIG. 1 by disassembling the film.

FIG. 3 illustrates the viewing angle control film 12 by disassembling the film.

Further, since the first phase difference plate 20 and the second phase difference plate 24 basically have the same configuration except that the orientation of the first phase difference plate 20 is different from the orientation of the second phase difference plate 24 at the time of disposition, the first phase difference plate 20 will be described below as a representative example.

As illustrated in FIG. 3, in the patterned optical anisotropic layer 20A of the first phase difference plate 20, the slow axis is divided into a plurality of belt-like regions in the same plane. In the example illustrated in the figure, the patterned optical anisotropic layer 20A has a total of six alternating first belt-like regions 20a and second belt-like regions 20b which are rectangular regions having the same width. In FIG. 3, each arrow in each belt-like region indicates the direction of the slow axis.

The first phase difference plate 20 is a λ/4 plate, the phase difference of the first belt-like region 20a and the second belt-like region 20b of the patterned optical anisotropic layer 20A is constant, and the directions of the slow axes of the first belt-like region 20a are orthogonal to the directions of the slow axes of the second belt-like region 20b. In other words, the patterned optical anisotropic layer 20A of the first phase difference plate 20 has patterned optical anisotropy in which two kinds of belt-like regions are alternately arranged such that the directions of the slow axes are orthogonal to each other.

Further, FIG. 3 shows an aspect in which the in-plane slow axis direction of the first belt-like region 20a and the in-plane slow axis direction of the second belt-like region 20b are orthogonal to each other, but the present invention is not limited thereto as long as the directions are different from each other. The angle between the in-plane slow axis of the first belt-like region 20a and the in-plane slow axis of the second belt-like region 20b is preferably in a range of 70° to 110°, more preferably in a range of 80° to 100°, and most preferably 90°.

In the description below, the "arrangement direction of the belt-like region" is also referred to as a "reference direction" in the first phase difference plate 20 and the second phase difference plate 24.

In the example illustrated in the figures, the first belt-like region 20a of the first phase difference plate 20 has a slow axis inclined by 45° with respect to the reference direction. The second belt-like region 20b has a slow axis inclined by 135° with respect to the reference direction.

The in-plane retardation Re (550) of the first belt-like region 20a and the second belt-like region 20b at a wavelength of 550 nm is not particularly limited, but is preferably in a range of 110 nm to 160 nm, more preferably in a range of 120 nm to 150 nm, and still more preferably in a range of 125 nm to 140 nm. Further, as in the example illustrated in the figure, it is preferable that the entire first phase difference plate 20 shows the range of the above-described in-plane retardation in a case where the first phase difference plate 20 has a layer (in the example illustrated in the figure, the support 20B) other than the patterned optical anisotropic layer 20A.

In a case where the first phase difference plate 20 includes the support 20B, it is preferable that the total value of Rth of the support 20B and Rth of the patterned optical anisotropic layer 20A satisfies a relationship of |Rth|≤20 nm.

In the present invention, the number of belt-like regions is not limited to six shown in the example illustrated in FIG. 3 and may be appropriately set depending on the width of the belt-like region and size of the viewing angle control film.

Further, in the example illustrated in the figure, the configuration provided with two kinds of belt-like regions where the directions of the slow axes are different from each other is employed, but the present invention is not limited thereto, and a configuration provided with three or more kinds of belt-like regions where the directions of the slow axes are different from one another may be employed. At this time, the configuration is not limited as long as the directions of the slow axes of the belt-like regions adjacent to each other are different from one another.

In regard to the above-described points, the same applies to the patterned optical anisotropic layer 24A of the second phase difference plate 24.

As described above, the patterned optical anisotropic layer 24A of the second phase difference plate 24 is a linear region with the same width and has a total of six alternating first belt-like regions 24*a* and second belt-like regions 24*b* where the directions of the slow axes are orthogonal to each other.

As illustrated in FIG. 3, the first phase difference plate 20 and the second phase difference plate 24 are disposed such that the first belt-like regions 20*a* and the second belt-like regions 20*b* of the first phase difference plate 20 and the first belt-like regions 24*a* and the second belt-like regions 24*b* of the second phase difference plate 24 intersect with each other.

In this manner, as illustrated in FIG. 2, 36 (6×6) rectangular regions are formed in the plane direction due to the intersection of the first belt-like regions 20*a* with the second belt-like regions 20*b* of the first phase difference plate 20 and the first belt-like regions 24*a* and the second belt-like regions 24*b* of the second phase difference plate 24.

In the description below, one rectangular region formed by the intersection of one belt-like region of the first phase difference plate 20 with one belt-like region of the second phase difference plate 24 is also referred to as an "intersection region".

As described above, the first phase difference plate 20 is a λ/4 plate, and the directions of the slow axes are orthogonal to each other in the first belt-like region 20*a* and the second belt-like region 20*b* of the patterned optical anisotropic layer 20A. Further, the second phase difference plate 24 is a λ/4 plate. Similarly, the directions of the slow axes are orthogonal to each other in the first belt-like region 24*a* and the second belt-like region 24*b* of the patterned optical anisotropic layer 24A. In addition, the directions of the slow axes with respect to the reference directions are the same as each other in the first belt-like region 20*a* of the patterned optical anisotropic layer 20A and the first belt-like region 24*a* of the patterned optical anisotropic layer 24A. Further, the directions of the slow axes with respect to the reference directions are the same as each other in the second belt-like region 20*b* of the patterned optical anisotropic layer 20A and the second belt-like region 24*b* of the patterned optical anisotropic layer 24A.

Accordingly, the intersection regions formed by the intersection of the belt-like regions of the first phase difference plate 20 with the belt-like regions of the second phase difference plate 24 become regions where the directions of the slow axes of the first phase difference plate 20 are the same as the directions of the slow axes of the second phase difference plate or become regions where the directions of the slow axes of the first phase difference plate 20 are different from the directions of the slow axes of the second phase difference plate 24 by 90° and have a configuration in which the respective regions are arranged in the lattice form.

Since the first phase difference plate 20 and the second phase difference plate 24 are each a λ/4 plate, the regions among the intersection regions, in which the directions of the slow axes of the first phase difference plate 20 are the same as the directions of the slow axes of the second phase difference plate, generate a phase difference of λ/2 in total of the first phase difference plate 20 and the second phase difference plate 24. Hereinafter, this intersection region is also referred to as a λ/2 region.

Meanwhile, the regions among the intersection regions, in which the directions of the slow axes of the first phase difference plate 20 and the directions of the slow axes of the second phase difference plate are different from each other by 90°, cancel each other by the first phase difference plate 20 and the second phase difference plate 24, and thus a phase difference is not generated (phase difference of 0). Hereinafter, this intersection region is also referred to as a transmitting region.

Accordingly, the intersection regions formed by the intersection of the belt-like regions of the first phase difference plate 20 with the belt-like regions of the second phase difference plate 24 have a configuration in which the λ/2 regions and the transmitting regions are arranged in the lattice form.

The first polarizer 18 is a layer which is laminated on a surface of the first phase difference plate 20 on a side opposite to the side of the second phase difference plate 24 and blocks a part of light transmitted through the second phase difference plate 24 and the first phase difference plate 20. Specifically, the first polarizer 18 transmits light that is incident at a small incidence angle with respect to the film surface of the first polarizer 18, in other words, substantially perpendicularly to the film surface thereof and blocks light that is incident at a large incidence angle with respect to the film surface thereof.

The first polarizer 18 is a film having an absorption axis in the thickness direction thereof. In other words, the first polarizer 18 is a film having an absorption axis in parallel with the normal direction of the film surface.

In a case where the first polarizer 18 has a structure in which a birefringent material (anisotropic absorbing material) is vertically aligned, the absorption axis is aligned substantially perpendicularly to the surface of the polarizing film. Since the absorption axis is aligned substantially perpendicularly to the main surface (the maximum surface, hereinafter, also referred to as the surface of the polarizing film) of the polarizing film, the film has a high transmittance from the front surface. However, the transmittance of the film is decreased as the viewpoint tilts obliquely because longitudinal wave light is absorbed.

Further, the "direction substantially perpendicularly" indicates that the absorption axis is aligned at an angle of 80° to 90°, preferably at an angle of 85° to 90°, and more preferably aligned vertically (90°) with respect to the surface of the polarizing film. In a case where the angle of the absorption axis with respect to the surface of the polarizing film is less than 80°, the transmittance of the film from the front surface is decreased in some cases.

Here, the alignment of the absorption axis in a direction substantially perpendicularly to the surface of the polarizing film can be confirmed by observing the cross section of the polarizing film using a transmission electron microscope (TEM).

Alternatively, a transmittance T of the first polarizer 18 is measured while changing a polar angle θ by 10° in the range of −50° to 50° using AxoScan OPMF-1 (manufactured by OPTO SCIENCE, INC.). In this measurement, in a case where the polar angle where the transmittance is maximized is set as $\theta_0°$, "90°−$\theta_0°$" becomes the "angle of the absorption axis". Therefore, it is possible to confirm the first polarizer 18 having an absorption axis in the thickness direction.

Further, the polar angle θ is an angle of the first polarizer 18 with respect to the vertical line of the film surface.

In a case where light is incident on the first polarizer 18 in the vertical direction, since the traveling direction of the light does not intersect with the absorption axis of the first polarizer 18, the light is transmitted without being absorbed.

Meanwhile, in a case where light is incident on the first polarizer 18 in an oblique direction, since the light advances in a direction intersecting with the absorption axis, a polarized light component in a direction parallel to the absorption axis is absorbed and a polarized light component in a direction orthogonal to the absorption axis is transmitted. In this manner, the first polarizer 18 blocks a part of the light.

Figure 4:
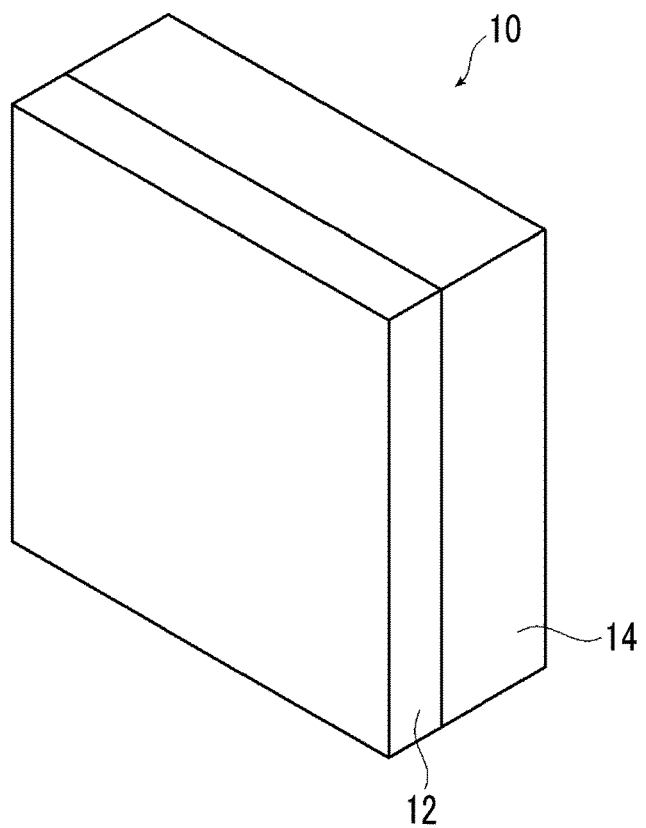
FIG. 4 is a perspective view conceptually illustrating an example of an image display device obtained by using the viewing angle control film of the present invention.

The viewing angle control film 12 including the first polarizer 18, the first phase difference plate 20, and the second phase difference plate 24 as described above is placed on a display surface of a liquid crystal display 14 as in a case of a liquid crystal display device 10 illustrated in FIG. 4. At this time, the viewing angle control film 12 is disposed such that the second phase difference plate 24 side faces the liquid crystal display 14. Further, the liquid crystal display device 10 is an example of the image display device according to the embodiment of the present invention and the liquid crystal display 14 is an example of the image display element of the present invention.

The liquid crystal display 14 typically includes a polarizer (second polarizer 26) in which the absorption axis is in the horizontal direction with respect to the film surface. Therefore, in the viewing angle control film 12, polarized light which has been transmitted through the second polarizer 26 is incident from the second phase difference plate 24 side (see FIG. 3).

As described above, the viewing angle control film 12 has a configuration in which the λ/2 regions and the transmitting regions are arranged in the lattice form due to the intersection of the belt-like regions of the first phase difference plate 20 with the belt-like regions of the second phase difference plate 24. In a case where the polarized light that has been transmitted through the second polarizer 26 is incident on the viewing angle control film 12, the light passing through the transmitting region is incident on the first polarizer 18 after passing through the first phase difference plate 20 and the second phase difference plate 24 while maintaining the polarized light at the time of incidence. Meanwhile, the light passing through the λ/2 region is incident on the first polarizer 18 due to the rotation of the polarization direction by 90°.

In other words, the light passing through the first phase difference plate 20 and the second phase difference plate 24 is emitted as any of light polarized in the same direction as that of incidence light or light polarized in a direction orthogonal to the polarization direction according to the intersection region and then is incident on the first polarizer 18.

Figure 5:
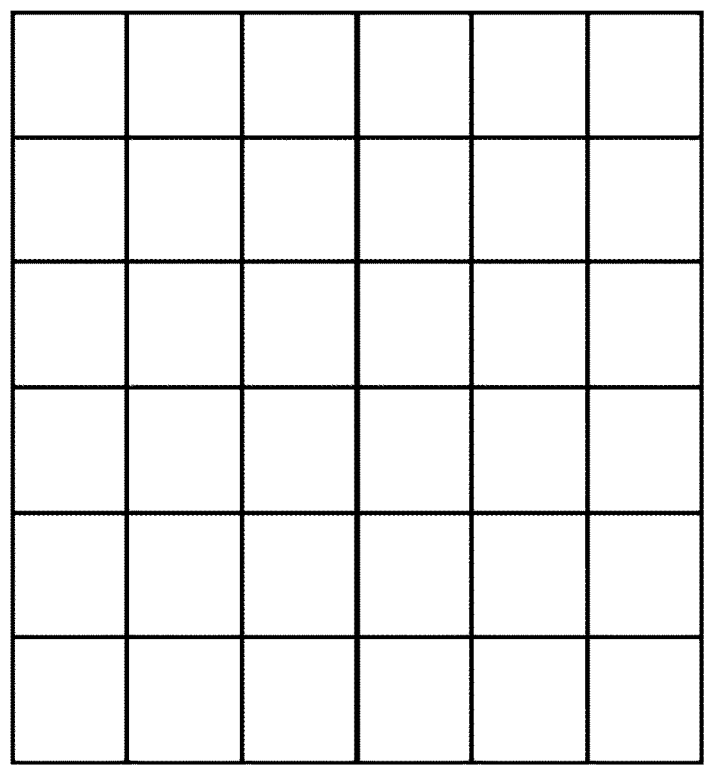
FIG. 5 is a conceptual view for describing the effect of the viewing angle control film of the present invention.

As described above, in the first polarizer 18, since the absorption axis is aligned substantially perpendicularly with respect to the surface of the polarizing film, light advancing in the front direction (direction perpendicular to the surface of the polarizing film) is transmitted through the first polarizer 18 regardless of the state of polarized light. Accordingly, in a case where the liquid crystal display device 10 formed by disposing the viewing angle control film 12 on the display surface is viewed from the front side, the entire screen can be visually recognized as illustrated in FIG. 5. In FIG. 5, the boundary of the intersection region is indicated by the solid line for the sake of explanation.

Meanwhile, light advancing in an oblique direction with respect to the surface of the polarizing film of the first polarizer 18 is absorbed in a case of the polarized light in a direction parallel to the absorption axis and is transmitted in a case of the polarized light in a direction orthogonal to the absorption axis. As described above, since the light having passed through the first phase difference plate 20 and the second phase difference plate 24 is emitted as any of light polarized in the same direction as that of incidence light or light polarized in a direction orthogonal to the polarization direction depending on whether the intersection region is a λ/2 region or a transmitting region, among light advancing in an oblique direction with respect to the surface of the polarizing film of the first polarizer 18, light in one polarization direction is absorbed and light in the other polarization direction is transmitted. Consequently, as illustrated in FIG. 6, regions where light is transmitted and visual recognition can be made and regions (indicated by solidly painting the regions in black in the figure) where light is absorbed and visual recognition cannot be made are generated in the lattice form.

Figure 6:
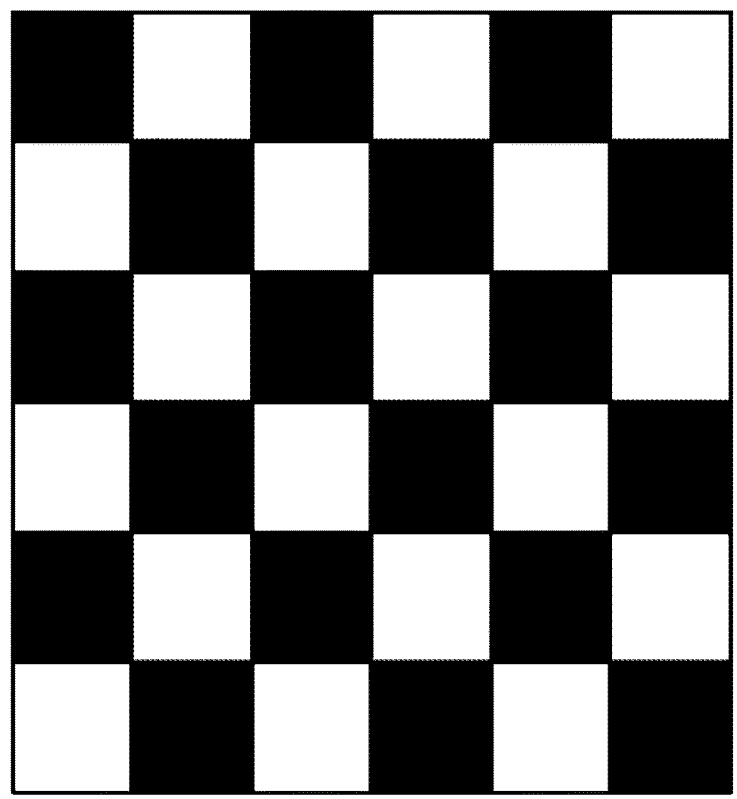
FIG. 6 is a conceptual view for describing the effect of the viewing angle control film of the present invention.

In this manner, in a case where the liquid crystal display device 10 formed by disposing the viewing angle control film 12 on the display surface is viewed in an oblique direction, regions which cannot be visually recognized in the lattice form are generated as illustrated in FIG. 6. Therefore, it is possible to prevent the surrounding third parties from peeping at the screen by narrowing the actual viewing angle.

Further, since the light having passed through the first phase difference plate 20 and the second phase difference plate 24 is emitted as any of light polarized in the same direction as that of incidence light or light polarized in a direction orthogonal to the polarization direction depending on whether the intersection region is a λ/2 region or a transmitting region, even in a case where the display surface of the liquid crystal display device 10 is viewed in any direction of 360°, any one of the polarized light becomes polarized light in a direction parallel to the absorption axis of the first polarizer 18 and then is absorbed. Therefore, regions where visual recognition cannot be made in the lattice form are generated so that the actual viewing angle can be narrowed.

As described above, since a louver film of the related art physically blocks light using arrangement of microlouvers, even in a case where light is incident perpendicularly to the louver film, the light is transmitted through a gap between microlouvers and is blocked at a position of the microlouvers. Therefore, there is a problem in that the brightness of a screen in the front direction is also degraded.

Further, in a configuration provided with one louver layer formed by arranging microlouvers in one direction, the viewing angle can be narrowed in the arrangement direction of the microlouvers, but the viewing angle does not change in a direction orthogonal to the arrangement direction. Accordingly, in order to narrow the viewing angle in all directions of 360°, a plurality of louver layers are required to be laminated by differentiating the arrangement directions of microlouvers. However, the lamination of a plurality of louver layers results in a problem of further degradation of the brightness of a screen in the front direction.

In addition, a composite polarizing plate formed by combining a vertically polarizing film in which an absorption axis of a polarizer is aligned substantially perpendicularly to the film surface and a horizontally polarizing film in which an absorption axis of a polarizer is aligned in a substantially horizontal direction with respect to the film surface is capable of narrowing the viewing angle in a specific direction, but it is not considered to narrow the viewing angle in all directions of 360°.

As described above, the viewing angle control film according to the embodiment of the present invention includes the first phase difference plate and the second phase difference plate which have a patterned optical anisotropic layer formed by arranging a plurality of belt-like regions in which the directions of the slow axes are different from one another and are disposed by intersecting the arrangement directions of the belt-like regions; and the first polarizer in which the absorption axis is in the direction perpendicular to the film surface. Further, the viewing angle control film absorbs a part of light advancing in an oblique direction with respect to the surface of the polarizing film of the first polarizer 18 in all directions of 360° by changing the polarization direction of incidence light depending on the intersection region formed of the first phase difference plate and the second phase difference plate, and thus the actual viewing angle in all directions of 360° can be narrowed. Further, since the viewing angle control film according to the embodiment of the present invention is not a film that physically blocks light but a film that absorbs light using the first polarizer in which the absorption axis is in the direction perpendicular to the film surface, degradation of the brightness in the front direction can be suppressed.

Here, the second polarizer 26 is a linearly polarizing plate having a polarizing axis in one direction, and a typical linearly polarizing plate, for example, an absorptive polarizing plate containing an iodine compound or a reflective polarizing plate such as a wire grid can be used as the second polarizer 26. Further, the polarizing axis has the same definition as the transmission axis.

Further, the width of each belt-like region in the first phase difference plate 20 and the second phase difference plate 24 is preferably in a range of 1 mm to 100 mm and more preferably in a range of 10 mm to 50 mm.

By setting the width of the belt-like region to 100 mm or less, the screen becomes difficult to be suitably visually recognized at the time of viewing the screen in an oblique direction. Further, by setting the width of the belt-like region to 1 mm or greater, occurrence of moire can be suppressed.

In addition, the width of the belt-like region of the first phase difference plate 20 may be the same as or different from the width of the belt-like region of the second phase difference plate 24.

Further, the number of the belt-like regions of the first phase difference plate 20 may be the same as or different from the number of the belt-like regions of the second phase difference plate 24.

As described above, the first phase difference plate 20 and the second phase difference plate 24 are each a $\lambda/4$ plate. A $\lambda/4$ plate (a plate having a $\lambda/4$ function) is a plate having a function of converting linearly polarized light with a specific wavelength into circularly polarized light (alternatively, circularly polarized light into linearly polarized light). More specifically, a $\lambda/4$ plate is a plate is a plate in which the in-plane retardation value at a predetermined wavelength of $\lambda$ nm is Re $(\lambda)=\lambda/4$ (alternatively, odd number times). This formula may be achieved at any wavelength (for example, 550 nm) in the visible light range. In a case where the first phase difference plate 20 is a $\lambda/4$ plate, this indicates that all combinations of the support 20B and each belt-like region of the patterned optical anisotropic layer 20A of the first phase difference plate 20 are $\lambda/4$ plates.

Further, it is preferable that the wavelength characteristics of the patterned optical anisotropic layer 20A of the first phase difference plate 20 and the patterned optical anisotropic layer 24A of the second phase difference plate 24 are inverse dispersion.

It is preferable that the patterned optical anisotropic layer contains a liquid crystalline compound.

As a method of forming a patterned optical anisotropic layer that contains a liquid crystalline compound, a method of immobilizing a liquid crystalline compound in an alignment state is exemplified. At this time, as a method of immobilizing a liquid crystalline compound, a method of polymerizing and immobilizing a liquid crystalline compound using a liquid crystalline compound having an unsaturated double bond (polymerizable group) as the above-described liquid crystalline compound is suitably exemplified. For example, a method of coating a transparent support with a composition for forming a patterned optical anisotropic layer that contains a liquid crystalline compound having an unsaturated double bond (polymerizable group) directly or via an alignment film, curing (polymerizing) the composition by irradiation of ionizing radiation, and immobilizing the liquid crystalline compound is exemplified. In addition, the patterned optical anisotropic layer may have a single layer structure or a laminated structure.

The type of the unsaturated double bond contained in the liquid crystalline compound is not particularly limited, but a functional group which is capable of an addition polymerization reaction is preferable, and a polymerizable ethylenically unsaturated group or a cyclic polymerizable group is preferable. More specifically, preferred examples thereof include a (meth)acryloyl group, a vinyl group, a styryl group, and an allyl group. Among these, a (meth)acryloyl group is more preferable.

A liquid crystalline compound can be typically classified into a rod-like compound and a disk-like compound based on the shape thereof. Further, the rod-like liquid crystalline compound and the disk-like liquid crystalline compound each have a low molecular type and a polymer type. A polymer usually indicates that the degree of polymerization is 100 or greater (Polymer Physics and Phase Transition Dynamics, written by Masao Doi, p. 2, published by Iwanami shoten, 1992). In the present invention, any liquid crystalline compound can be used, and it is preferable to use a rod-like liquid crystalline compound or a discotic liquid crystalline compound (disk-like liquid crystalline compound). Two or more kinds of rod-like liquid crystalline compounds, two or more kinds of disk-like liquid crystalline compounds, or a mixture of a rod-like liquid crystalline compound and a disk-like liquid crystalline compound may be used. It is more preferable that the patterned optical anisotropic layer is formed using a rod-like liquid crystalline compound or a disk-like liquid crystalline compound that contains a polymerizable group in order to immobilize the above-described liquid crystalline compound and still more preferable that the liquid crystalline compound contains two or more polymerizable groups in one molecule. In a case where the liquid crystalline compound is a mixture of two more kinds thereof, it is preferable that at least one kind of liquid crystalline compound contains two or more polymerizable groups in one molecule.

As the rod-like liquid crystalline compound, for example, the compounds described in claim 1 of JP1999-513019A (JP-H11-513019A) and paragraphs <0026> to <0098> of JP2005-289980A can be preferably used. As the discotic liquid crystalline compound, for example, the compounds described in paragraphs <0020> to <0067> of JP2007-108732A and paragraphs <0013> to <0108> of JP2010-244038A can be preferably used, but the present invention is not limited thereto.

The alignment state of the liquid crystalline compound is controlled in order to set the in-plane retardation in the patterned optical anisotropic layer to be in the above-described range. At this time, in a case where a rod-like liquid crystalline compound is used, it is preferable that the rod-like liquid crystalline compound is immobilized in a state of being horizontally aligned. Further, in a case where a discotic liquid crystalline compound is used, it is preferable that the discotic liquid crystalline compound is immobilized in a state of being vertically aligned. In the present invention, the "rod-like liquid crystalline compound is horizontally aligned" means that the director of the rod-like liquid crystalline compound is parallel with the layer surface, and the "discotic liquid crystalline compound is vertically aligned" means that the direction of the normal line of the disc plane of the discotic liquid crystalline compound is parallel to the film surface of the patterned optical anisotropic layer. The exact horizontal alignment or exact vertical alignment is not required and the error range is ±20° from each of the exact angles. The error range is preferably within ±5°, more preferably within ±3°, still more preferably ±2°, and most preferably ±1°.

Further, in order to make the liquid crystalline compound enter the horizontal alignment state or vertical alignment state, an additive (alignment control agent) that promotes horizontal alignment or vertical alignment may be used. Various known additives can be used as the additive.

Various known methods can be used as the method of forming the patterned optical anisotropic layer. Examples of the method include methods described in paragraphs 0039 to 0041 of JP2014-089431A.

The thickness of the patterned optical anisotropic layer is not particularly limited, but is preferably in a range of 0.1 μm to 10 μm and more preferably in a range of 0.1 μm to 5 μm, from the viewpoint of further reducing the thickness of the optical film.

The first phase difference plate 20 and the second phase difference plate 24 may include layers other than the patterned optical anisotropic layer.

For example, in the viewing angle control film 12 in the example illustrated in the figure, the first phase difference plate 20 includes the transparent support 20B and the second phase difference plate 24 includes the transparent support 24B. In other words, both phase difference plates may be configured to have a transparent support and a patterned optical anisotropic layer disposed on the support. In a case where both phase difference plates comprise a support, the mechanical strength of the phase difference plates is improved.

Examples of the material for forming the support 20B and the support 24B include a polycarbonate-based polymer, a polyester-based polymer such as polyethylene terephthalate or polyethylene naphthalate, a (meth)acrylic polymer such as polymethyl methacrylate, a styrene-based polymer such as polystyrene or an acrylonitrile-styrene copolymer (AS resin), a polyolefin-based polymer such as polyethylene, polypropylene, or an ethylene-propylene copolymer, a vinyl chloride-based polymer, an amide-based polymer such as nylon or aromatic polyamide, a polysulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, and an epoxy-based polymer.

As the material for forming the support, a thermoplastic norbornene-based resin can be preferably used. Examples of the thermoplastic norbornene-based resin include ZEONEX and ZEONOR (manufactured by Zeon corporation), and ARTON (manufactured by JSR Corporation).

Further, as the material for forming the support, a cellulose-based polymer (hereinafter, also referred to as cellulose acylate) typified by triacetyl cellulose can be preferably used.

The thickness of the support is not particularly limited, but is preferably in a range of 15 μm to 100 μm, more preferably in a range of 20 μm to 80 μm, and particularly preferably in a range of 40 μm to 60 μm from the viewpoint of reducing the thickness of the first phase difference plate 20 and the second phase difference plate 24.

Further, various additives (such as an optically anisotropic adjusting agent, a wavelength dispersion adjusting agent, fine particles, a plasticizer, an ultraviolet absorbing agent, a deterioration inhibitor, and a release agent) can be added to the support.

An alignment film may be provided between the support 20B of the first phase difference plate 20 and the patterned optical anisotropic layer 20A and/or between the support 24B of the second phase difference plate 24 and the patterned optical anisotropic layer 24A. By providing the alignment film, the alignment direction of the liquid crystalline compound in the patterned optical anisotropic layer can be easily controlled.

The alignment film typically contains a polymer as a main component. As the material of a polymer for an alignment film, various commercially available products described in numerous documents can be used. Preferred examples of the polymer material to be used include polyvinyl alcohol, polyimide, and derivatives of there. Particularly, modified or unmodified polyvinyl alcohol is preferable. As the alignment film which can be used in the present invention, modified polyvinyl alcohol described in line 24, p. 43 to line 8, p. 49 of WO01/088574A1 and paragraphs <0071> to <0095> of JP3907735B can be referred to. Further, the alignment film is usually subjected to a known rubbing treatment. In other words, it is preferable that the alignment film is a rubbing alignment film which has been subjected to a rubbing treatment.

It is preferable that the thickness of the alignment film is small. However, from the viewpoints of imparting alignment ability for forming a patterned optical anisotropic layer and relaxing the surface unevenness of the support to form a patterned optical anisotropic layer having a uniform film thickness, it is preferable that the alignment film has a certain degree of thickness. Specifically, the thickness of the alignment film is preferably in a range of 0.01 µm to 10 µm, more preferably in a range of 0.01 µm to 1 µm, and still more preferably in a range of 0.01 µm to 0.5 µm.

Further, in the present invention, it is also preferable to use a photoalignment film. The photoalignment film is not particularly limited, and examples thereof include films described in paragraphs <0024> to <0043> of WO2005/096041A and LPP-JP265CP (trade name, manufactured by Rolic technologies Ltd.).

Hereinafter, a preferred example of the method of producing the first phase difference plate 20 and the second phase difference plate 24 formed of a photoalignment film will be described with reference to the conceptual view of FIG. 7. Further, the methods of preparing both phase difference plates are the same as each other. Therefore, the description will be made using the first phase difference plate 20 as a representative example.

First, the surface of the support 20B is coated with a composition for forming a photoalignment film according to a known method such as spin coating and dried to form a photoisomerizable composition layer L which becomes a photoalignment film.

Next, the support 20B used to form the photoisomerizable composition layer L which becomes a photoalignment film is placed on a movable stage 30 that linearly moves in one direction.

Further, a light screen 32 is immobilized above the support 20B such that the edges of the light screen 32 and the support 20B match each other and the light screen 32 does not cover the support 20B. In this manner, during the movement of the movable stage 30 to the side of the light screen 32, the support 20B (photoisomerizable composition layer L) is hidden below the light screen 32 by the movement amount.

Further, a linearly polarizing plate 34 such as a wire grid polarizing plate is rotatably provided above the light screen 32 by setting the center thereof as a rotary axis in a state of facing the support 20B. The linearly polarizing plate 34 may rotate according to a known method of using an ultraviolet (UV)-transmitting rotary stage.

Further, a light source is disposed such that the photoisomerizable composition layer L is irradiated with light that aligns the photoisomerizable composition layer L, such as UV, through the linearly polarizing plate 34.

In this state, first, the photoisomerizable composition layer L is irradiated with UV through the linearly polarizing plate 34. The photoisomerizable composition layer L is aligned by irradiation with UV according to the direction of the polarizing axis of the linearly polarizing plate 34.

Next, the linearly polarizing plate 34 is allowed to rotate at a predetermined angle, for example, 90°, and the movable stage 30 is allowed to move in the x direction indicated by the arrow, that is, toward the light screen 32 by the same distance as the width of the belt-like region. Accordingly, the photoisomerizable composition layer L is blocked from UV by the light screen 32 by the width of the belt-like region. Thereafter, the photoisomerizable composition layer L is irradiated with UV through the linearly polarizing plate 34 again, and the photoisomerizable composition layer L is aligned.

Next, similarly, the linearly polarizing plate 34 is allowed to rotate, for example, at 90°, the movable stage 30 is allowed to move in the x direction indicated by the arrow by the same distance as the width of the belt-like region, and the layer L of the composition is irradiated with UV through the linearly polarizing plate 34 again so that the photoisomerizable composition layer L is aligned.

Hereinafter, similarly, the rotation of the linearly polarizing plate 34 at a predetermined angle, the movement of the movable stage 30 in the x direction indicated by the arrow, and the irradiation with UV are repeatedly performed to form the photoalignment film on the surface of the support 20B.

After the photoalignment film is formed in the above-described manner, the first phase difference plate 20 is prepared by coating the film with a liquid crystal composition which becomes the patterned optical anisotropic layer 20A, drying the composition, and curing the composition by irradiation with ultraviolet rays.

As is well known, the alignment of the photoisomerizable composition which becomes the photoalignment film depends on the polarized light finally applied. Therefore, by forming the photoalignment film and the patterned optical anisotropic layer 20A in the above-described manner, the patterned optical anisotropic layer 20A having a plurality of alternating belt-like regions where the directions of the slow axes are orthogonal to each other can be formed as illustrated in FIG. 3.

The configuration of the first polarizer 18 is not particularly limited as long as the absorption axis is provided in the thickness direction. Among examples of the first polarizer, a first polarizer 18 that contains a birefringent material (material having birefringence) and is formed by aligning the birefringent material in a predetermined direction is preferable. More specifically, for example, in a case where a dichroic coloring agent described below is used as the birefringent material, the birefringent material is aligned such that the long axis of the dichroic coloring agent is in parallel with the thickness direction of the first polarizer 18.

The birefringent material is not particularly limited and can be appropriately selected according to the purpose thereof. Examples thereof include dichroic coloring agents, inorganic particles, liquid crystalline compounds, anisotropic metal nanoparticles, carbon nanotubes, and metal complexes. Among these, dichroic coloring agents, liquid crystalline compounds, anisotropic metal nanoparticles, and carbon nanotubes are preferable, and dichroic coloring agents are particularly preferable.

—Dichroic Coloring Agent—

Examples of the dichroic coloring agent include an azo-based coloring agent and an anthraquinone-based coloring agent. These may be used alone or in combination of two or more kinds thereof.

In the present invention, the dichroic coloring agent is defined as a compound having a function of absorbing light. The maximum absorption and the absorption band of the dichroic coloring agent are not limited, but a dichroic coloring agent having a maximum absorption in a yellow region (Y), a magenta region (M), or a cyan region (C) is preferable. Further, two or more kinds of dichroic coloring agents may be used. Further, it is preferable that a mixture of dichroic coloring agents each having a maximum absorption in Y, M, and C is used and more preferable that dichroic coloring agents are mixed such that absorption can be made in the entire visible range (400 nm to 750 nm) and used. Here, the yellow region is in a range of 420 nm to 490 nm, the magenta region is in a range of 495 nm to 570 nm, and the cyan region is in a range of 620 nm to 750 nm.

Here, a chromophore used for the dichroic coloring agent will be described. The chromophore of the dichroic coloring agent is not particularly limited and can be appropriately selected according to the purpose thereof. Examples thereof include an azo coloring agent, an anthraquinone coloring agent, a perylene coloring agent, a merocyanine coloring agent, an azomethine coloring agent, a phthaloperylene coloring agent, an indigo coloring agent, an azulene coloring agent, a dioxazine coloring agent, a polythiophene coloring agent, and a phenoxazine coloring agent. Among these, an azo coloring agent, an anthraquinone coloring agent, or a phenoxazine coloring agent is preferable, and an anthraquinone coloring agent or a phenoxazine coloring agent (phenoxazine-3-one) is more preferable.

Further, specific examples of the coloring agent include the coloring agents described in paragraphs 0022 to 0075 of JP2008-275976A, and the contents of which are incorporated herein by reference.

—Anisotropic Metal Nanoparticles—

Anisotropic metal nanoparticles are nano-sized rod-like metal fine particles having a diameter of several nanometers to 100 nm. The rod-like metal fine particles indicate particles having an aspect ratio (length of long axis/length of short axis) of 1.5 or greater.

Such anisotropic metal nanoparticles exhibit surface plasmon resonance and exhibit absorption in the ultraviolet to infrared region. For example, since the anisotropic metal nanoparticles having a short axis length of 1 nm to 50 nm, a long axis length of 10 nm to 1000 nm, and an aspect ratio of 1.5 or greater are capable of changing the absorption position in the short axis direction and the long axis direction, the first polarizer obtained by aligning such anisotropic metal nanoparticles in an oblique direction with respect to the horizontal plane of the film becomes an anisotropic absorbing film.

—Carbon Nanotubes—

A carbon nanotube is elongated tubular carbon having a fiber diameter of 1 nm to 1000 nm, a length of 0.1 μm to 1000 μm, and an aspect ratio of 100 to 10000. Examples of a known method of preparing carbon nanotubes include an arc discharge method, a laser evaporation method, a thermal CVD method, and a plasma CVD method. As carbon nanotubes obtained using an arc discharge method and a laser evaporation method, single wall nanotubes (SWNT) with only one graphene sheet and multi wall nanotubes (MWNT) with a plurality of graphene sheets are used.

Further, in a case where a thermal CVD method and a plasma CVD method are used, MWNT can be mainly prepared. SWNT has a structure in which one graphene sheet formed by connecting carbon atoms using a strongest bond referred to as an SP2 bond in a hexagonal shape is wound into a tubular shape.

The content of the birefringent material in the first polarizer is preferably in a range of 0.1% by mass to 90.0% by mass and more preferably in a range of 1.0% by mass to 30.0% by mass. In a case where the content of the birefringent material is 0.1% by mass or greater, the polarizability can be sufficiently obtained. Meanwhile, in a case where the content thereof is 90% by mass or less, the first polarizer can be formed without any trouble and the transmittance of the first polarizer can be maintained.

The first polarizer contains other components such as a dispersant, a solvent, and a binder resin in addition to the birefringent material depending on the method of forming the first polarizer (alignment method).

A method of producing the first polarizer is not particularly limited as long as the absorption axis can be aligned in the direction substantially perpendicular to the surface of the base material (the surface of the polarizer) and can be appropriately selected according to the purpose thereof. Examples thereof include a metal nanorod deposition method in a liquid crystal alignment field (1); a guest-host liquid crystal method (2); and an anodized alumina method (3). Among these, a guest-host liquid crystal method is particularly preferable.

Examples of the method include the methods described in paragraphs 0087 to 0108 of JP2008-275976A, and the contents of which are incorporated herein by reference.

The thickness of the first polarizer is not particularly limited and can be appropriately selected according to the purpose thereof. Further, the thickness thereof is preferably in a range of 0.1 μm to 10 μm and more preferably in a range of 0.3 μm to 3 μm.

As the liquid crystal display 14, various known liquid crystal displays of the related art can be used.

Typically, a liquid crystal display includes a linearly polarizing plate (second polarizer 26) in which the absorption axis is in the horizontal direction with respect to the film surface.

Further, the image display device according to the embodiment of the present invention is not limited to those formed by using a liquid crystal display as an image display element. Further, an image display device formed by using an organic EL display may be employed as the image display device.

The second polarizer 26 is not limited as long as a linearly polarizing plate which has a polarizing axis in one direction and has a function of converting natural light into specific linearly polarized light, and an absorptive polarizing plate can be employed.

The type of the second polarizer 26 is not particularly limited, and various second polarizers 26 which have been used can be employed as described above. Therefore, for example, any of an iodine-based polarizing plate, a coloring agent-based polarizing plate obtained by using a dichroic coloring agent, or a polyene-based polarizing plate can also be used. The iodine-based polarizing plate and a coloring agent-based polarizing plate can be prepared by allowing polyvinyl alcohol to adsorb iodine or a dichroic coloring agent and performing stretching.

In the example illustrated in the figure, the polarizing axis of the second polarizer 26 matches the arrangement direction (reference direction) of the belt-like regions of the second phase difference plate 24. However, in the present invention, the direction of the polarizing axis of the second polarizer 26 may be any of a direction orthogonal to the reference direction or a direction at 45° with respect to the reference direction as long as the direction thereof is one direction.

Further, in a case where the liquid crystal display does not include a linearly polarizing plate on the emission side, in other words, in a case where light emitted from the liquid crystal display is not linearly polarized light, a configuration in which the viewing angle control film includes a linearly polarizing plate on the side of the second phase difference plate may be employed.

Hereinbefore, the viewing angle control film and the image display device according to the embodiment of the present invention have been described in detail, but the present invention is not limited to the above-described examples, and various modifications and improvements can be made within the range not departing from the scope of the present invention.

EXAMPLES

The present invention will be described in detail with reference to the following examples. The materials, the used reagents, the used amounts, the amounts of substances, the ratios, the treatment contents, and the treatment procedures described in the following examples can be appropriately changed within the range not departing from the gist of the present invention. Therefore, the range of the present invention should not be limitatively interpreted by the following examples.

Example 1

<Preparation of Support>

The following materials were put into a mixing tank and stirred while being heated so that each component was dissolved, thereby preparing a cellulose acetate solution.

(Composition of Cellulose Acetate Solution)

| | |
|---|---|
| Cellulose acetate having acetylation degree of 60.7% to 61.1% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |
| 1-butanol (third solvent) | 11 parts by mass |

16 parts by mass of the following retardation raising agent (A), 92 parts by mass of methylene chloride, and 8 parts by mass of methanol were put into another mixing tank and stirred while being heated, thereby preparing a retardation raising agent solution.

Retardation raising agent (A)

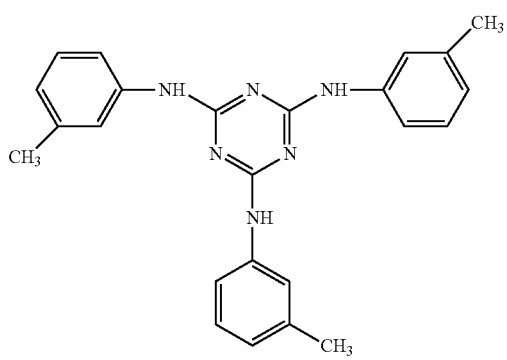

25 parts by mass of the retardation raising agent solution was mixed with 474 parts by mass of the cellulose acetate solution, and the resulting solution was sufficiently stirred to prepare a dope. The amount of the retardation raising agent (A) to be added was 6.0 parts by mass with respect to 100 parts by mass of cellulose acetate.

The obtained dope was cast using a band stretching machine. After the film surface temperature of the film on the band reached 40° C., the film was dried with hot air at 70° C. for 1 minute. Further, the film was dried with dry air at 140° C. for 10 minutes, thereby preparing a triacetyl cellulose film having a residual solvent amount of 0.3% by mass.

This film was set as a support.

<Preparation of Composition for Photoalignment Film>
<<Polymer>>

100 parts by mass of 2-(3,4-epoxycyclohexyl)ethyltrimethoxysilane, 500 parts by mass of methyl isobutyl ketone, and 10 parts by mass of triethylamine were put into a reaction container comprising a stirrer, a thermometer, a dropping funnel, and a reflux cooling pipe and mixed at room temperature.

Next, 100 parts by mass of deionized water was added dropwise to a solution in the reaction container for 30 minutes using the dropping funnel, and the obtained solution was allowed to react at 80° C. for 6 hours while being mixed under reflux. After the reaction was completed, an organic phase was taken out from the solution, and the organic phase was washed with a 0.2 mass % ammonium nitrate aqueous solution until the water after washing the organic phase became neutral. Thereafter, the solvent and water were distilled off under reduced pressure, thereby obtaining epoxy group-containing polyorganosiloxane as a viscous transparent liquid.

As the result of $^1$H-NMR (nuclear magnetic resonance) analysis performed on this epoxy group-containing polyorganosiloxane, it was confirmed that a peak based on an oxiranyl group was obtained in the vicinity of the chemical shift ($\delta$) of 3.2 ppm according to the theoretical strength and a side reaction of the epoxy group did not occur during the reaction. The weight-average molecular weight Mw of this epoxy group-containing polyorganosiloxane was 2200 and the epoxy equivalent was 186 g/mol.

Next, 10.1 parts by mass of the epoxy group-containing polyorganosiloxane obtained in the above-described manner, 0.5 parts by mass of acrylic group-containing carboxylic acid ("ARONIX M-5300" (trade name), manufactured by Toagosei Company, Ltd., ω-carboxypolycaprolactone acrylate (degree of polymerization n≈2)), 20 parts by mass of butyl acetate, 1.5 parts by mass of formic acid derivative obtained according to the method in Synthesis Example 1 of JP2015-026050A, and 0.3 parts by mass of tetrabutyl ammonium bromide were put into a 100 mL three-neck flask, and the obtained reaction solution was stirred at 90° C. for 12 hours.

After the reaction was completed, the reaction solution was diluted with the same amount (mass) of butyl acetate as the amount of the reaction solution and washed with water three times.

The operation of concentrating the obtained solution and diluting the solution with butyl acetate was repeated two times to finally obtain a solution containing polyorganosiloxane (polymer) that contains a photo-aligned group. The weight-average molecular weight Mw of this polymer was 9000. Further, as the result of $^1$H-NMR analysis, the amount of the component containing a cinnamate group in the polymer was 23.7% by mass.

<<Composition for Photoalignment Film>>

A polymer which had been polymerized in advance, and the following amounts of the compounds D1 and D2 were added using butyl acetate as a solvent, thereby preparing a composition for a photoalignment film.

(Composition for Photoalignment Film)

| | |
|---|---|
| Butyl acetate | 100 parts by mass |
| Polymer polymerized in the above-described manner | 4.35 parts by mass |
| Compound D1 | 0.48 parts by mass |
| Compound D2 | 1.15 parts by mass |

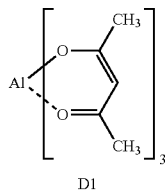

D1

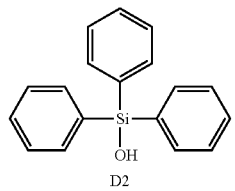

D2

<Preparation of Coating Solution 1 for Patterned Optical Anisotropic Layer>

A coating solution 1 for a patterned optical anisotropic layer with the following composition was prepared.

(Coating Solution 1 for Patterned Optical Anisotropic Layer)

| | |
|---|---|
| Methoxy ethyl acrylate | 533.68 parts by mass |
| Mixture of rod-like liquid crystalline compounds shown below | 100 parts by mass |
| Monomer shown below | 5 parts by mass |
| Polymerization initiator shown below | 6 parts by mass |
| Surfactant shown below | 0.25 parts by mass |

Mixture of rod-like liquid crystalline compounds

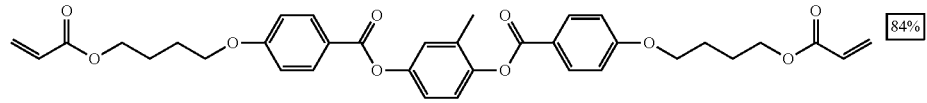

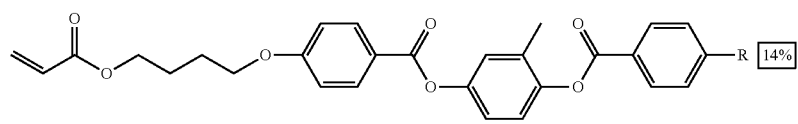

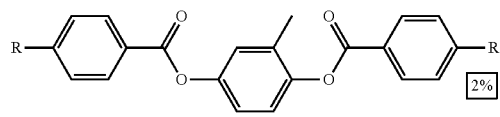

Monomer

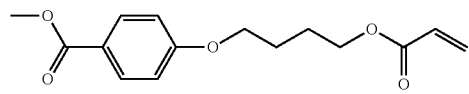

Polymerization initiator

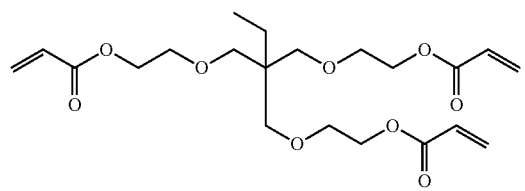 [SMILES: C=CC(=O)OCCOCC(CC)(COCCOC(=O)C=C)COCCOC(=O)C=C]

Surfactant

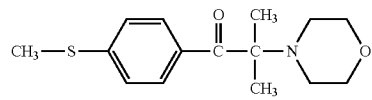

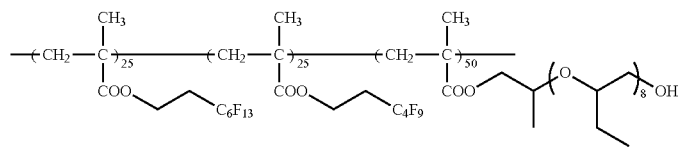

<Formation of Photoisomerizable Composition Layer>

The support prepared in advance was coated with the composition for a photoalignment film prepared in advance using a #2.0 bar. Thereafter, the support coated with the composition for a photoalignment film was dried on a hot plate at 100° C. for 5 minutes so that the solvent was removed, thereby forming a photoisomerizable composition layer having a thickness of 0.2 μm.

<Formation of Photoalignment Film>

A photoalignment film was prepared in the following manner using a movable stage (ALS-305-CM, manufactured by Central Motor Wheel Co., Ltd.), a rotary stage (SGSP-60YAW-0B, manufactured by Sigma Koki Co., Ltd.), a light screen, a wire grid polarizing plate (product code: #46-636, manufactured by Edmond), and an ultraviolet irradiation device (EX250-W, manufactured by HOYA-SCOTT Corporation).

Figure 7:
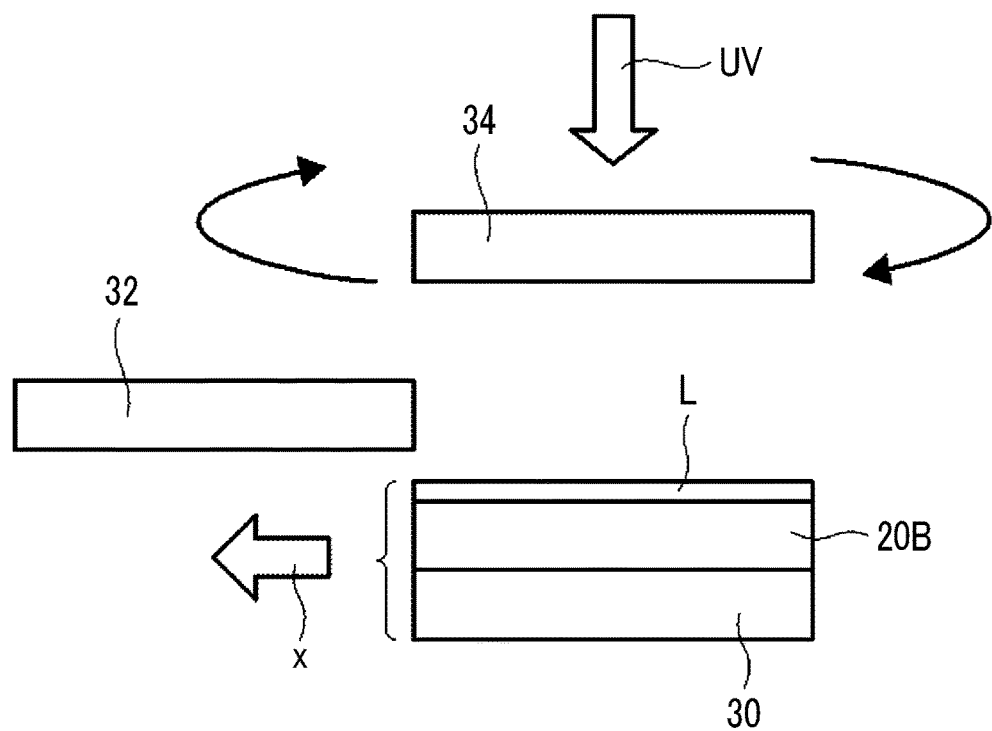
FIG. 7 is a conceptual view for describing an example of a method of producing a viewing angle control film.

As conceptually illustrated in FIG. 7, the prepared support provided with a photoisomerizable composition layer was placed on a movable stage, and a light screen was disposed by being immobilized on the movable stage. The light screen was disposed such that the edges of the light screen and the support were allowed to match each other and the support was not covered by the light screen. In this manner, during the movement of the movable stage to the side of the light screen, the photoisomerizable composition layer of the support was hidden below the light screen by the movement amount.

Further, the rotary stage was disposed by being immobilized on the movable stage, the wire grid polarizing plate was placed on the rotary stage so as to be rotatable. The polarizing axis of the wire grid polarizing plate was allowed to match the movement direction of the movable stage.

30 mJ/cm$^2$ of ultraviolet rays were applied through the wire grid polarizing plate. Thereafter, the movable stage was allowed to move by a distance of 1.0 mm, and the wire grid polarizing plate was allowed to rotate by 90°. Next, similarly, ultraviolet rays were applied. Subsequently, the movement of the movable stage by a distance of 1.0 mm, the rotation of the polarizing plate by 90°, and the irradiation with ultraviolet rays were repeated until the total operation distance of the movable stage reached 200 mm, thereby forming a photoalignment film on the support. In other words, the number of times of repetition was 200 times.

<Preparation of Phase Difference Plate (λ/4 Plate) (Formation of Patterned Optical Anisotropic Layer)>

The photoalignment film formed in the above-described manner was coated with the coating solution 1 for a patterned optical anisotropic layer prepared in advance using a #2.4 bar.

Thereafter, the support coated with the coating solution 1 for a patterned optical anisotropic layer was dried on a hot plate at 90° C. for 2 minutes to form a layer having a composition which becomes a patterned optical anisotropic layer. Next, the temperature thereof was held at 60° C., the layer was irradiated (500 mJ/cm$^2$) with ultraviolet rays, the alignment thereof was fixed to form a patterned optical anisotropic layer having a film thickness of 1.0 μm, thereby preparing each phase difference plate (a first phase difference plate and a second phase difference plate).

Both of the first phase difference plate and the second phase difference plate have 1400 alternating belt-like regions where the slow axes are orthogonal to each other.

<Confirmation of Patterned Optical Anisotropic Layer>

The patterned optical anisotropic layer of the prepared phase difference plate was observed using a polarizing microscope (ECLIPSE E600-POL).

As the result, as illustrated in FIG. 3, it was confirmed that the belt-like regions each having a width of 1.0 mm, in which the directions of the slow axes were alternately different by 90°, were continuously and repeatedly formed in a direction orthogonal to the longitudinal direction, on the patterned optical anisotropic layer.

<Measurement of Front Phase Difference>

In order to measure the front phase difference, a photoalignment film was formed in the same manner as described above except that a photoisomerizable composition layer having a thickness of 0.2 μm which becomes a photoalignment film was formed on the support, and this photoisomerizable composition layer was irradiated (30 mJ/cm$^2$) with ultraviolet rays once without rotating the wire grid polarizing plate.

Thereafter, similarly, the film was coated with the coating solution 1 for a patterned optical anisotropic layer, dried, and cured with ultraviolet rays to prepare a phase difference plate including a patterned optical anisotropic layer with a film thickness of 1.0 μm.

The front phase difference of the phase difference plate was measured using Axometry (manufactured by Axometrics, Inc.). As the result, the front phase difference of the phase difference plate was 138 nm.

The prepared two phase difference plates (the first phase difference plate and the second phase difference plate) were laminated such that the belt-like regions were orthogonal to each other, and were bonded using a pressure sensitive adhesive.

<Preparation of First Polarizer>

1.11 g of an initiator solution [a solution obtained by dissolving 0.90 g of IRGACURE 907 (manufactured by BASF SE) and 0.30 g of KAYACURE DETX (manufactured by Nippon Kayaku Co., Ltd.) in 8.80 g of methyl ethyl ketone (MEK)] was added to a liquid crystal compound solution obtained by dissolving 3.04 g of a liquid crystalline compound (PALIOCOLOR LC242 (trade name), manufactured by BASF SE) containing a photopolymerizable group and 0.1 g of a polymeric surfactant (MEGAFACE F780F, manufactured by DIC Corporation) in 5.07 g of methyl ethyl ketone (MEK), and the solution was stirred for 5 minutes for complete dissolution.

Next, 0.023 g of a dichroic azo coloring agent G241 (manufactured by HAYASHIBARA CO., LTD.) and 0.005 g of a dichroic azo coloring agent G472 (manufactured by HAYASHIBARA CO., LTD.) were added to the obtained solution and subjected to ultrasonic dispersion for 5 minutes, thereby preparing a polarizer coating solution.

<Formation of Acrylic Layer>

The following materials were put into a mixing tank, stirred, and filtered using a polypropylene filter having a pore diameter of 0.4 μm, thereby preparing a composition for forming an acrylic layer.

<<Composition for Forming Acrylic Layer>>

| Compound A | 70 parts by mass |
| Compound B | 30 parts by mass |
| Isopropyl alcohol | 425 parts by mass |
| Methyl acetate | 142 parts by mass |

Compound A: KAYARAD PET 30: manufactured by Nippon Kayaku Co., Ltd., a mixture of a compound with the following structure, the mass average molecular weight is 298, and the number of functional groups in one molecule is 3.4 (average).

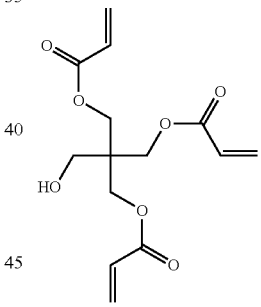

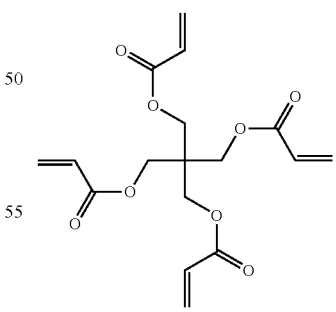

Compound B: BLEMMER GLM: manufactured by NOF CORPORATION, a compound with the following structure

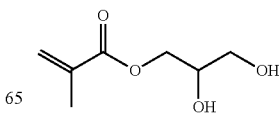

4% by mass of a photopolymerization initiator (IRGA-CURE 127, manufactured by BASF SE) was added to the prepared composition for forming an acrylic layer with respect to the solid content in the composition for forming an acrylic layer.

Next, the support was coated with the composition for forming an acrylic layer obtained by adding a photopolymerization initiator, using a gravure coater. The composition was dried at 100° C. and irradiated with ultraviolet rays having an illuminance of 400 mW/cm$^2$ and an irradiation dose of 150 mJ/cm$^2$ using an air-cooled metal halide lamp (manufactured by EYE GRAPHICS CO., LTD.) having an intensity of 160 W/cm while nitrogen purging such that the oxygen concentration was set to 1.0% by volume or less so that the coating layer was cured, thereby forming an acrylic layer on the support. The thickness of the acrylic layer was 0.3 µm. This acrylic layer is formed into a vertical alignment film in the first polarizer.

The acrylic layer was coated with the prepared polarizer coating solution using a bar coater such that the coating amount thereof was set to 4 mL/m$^2$.

The layer was heated at a maturing temperature of 180° C. for 120 seconds and irradiated with UV (50 mW, 300 mJ/cm$^2$) using an ultraviolet irradiation device (mercury xenon lamp) while the temperature was maintained at 25° C., and the crosslinking reaction was promoted, thereby obtaining an optical film. This optical film was set as a first polarizer.

This first polarizer and two phase difference plates (laminated such that the belt-like regions were orthogonal to each other) prepared in the above-described manner were bonded to each other using a pressure sensitive adhesive, thereby preparing a viewing angle control film.

Evaluation

Comparative Example 1

Using an iPad (registered trademark, manufactured by Apple Inc.) as a liquid crystal display, the front brightness at the time of setting the screen as white display was measured using a color brightness meter (BM-5, manufactured by TOPCON CORPORATION). The value thereof at this time was set to 100.

Example 1

Next, the prepared viewing angle control film was disposed on the polarizing plate of an iPad (registered trademark) on a viewing side. At this time, the phase difference plate side was set as the polarizing plate on a viewing side. With this configuration, the front white brightness was measured and the value was 85. Further, the screen was seen at a polar angle of 45° after displaying characters, and visual confirmation whether the characters were able to be read was made. As the result, it was not possible to visually recognize the characters in any direction.

Comparative Example 2

The evaluation was performed in the same manner as in Example 1 except that a louver film (PF14. 1W MD, manufactured by 3M) was disposed in place of the viewing angle control film.

As the result, the front white brightness was 70. Further, the characters were not able to be visually recognized in the direction indicated by the arrow 26 in FIG. 3, but were able to be visually recognized clearly in directions other than the direction indicated by the arrow 26, particularly, in the direction perpendicularly to the direction indicated by the arrow 26 in FIG. 3.

TABLE 1

| | Type of film | Front white brightness | Control of viewing angle (polar angle of 45°) |
|---|---|---|---|
| Example 1 | Viewing angle control film | 85 | Viewing angle being narrowed in all directions of 360° |
| Comparative Example 1 | None | 100 | — |
| Comparative Example 2 | Louver film | 70 | Viewing angle being narrowed only in specific direction |

As shown in the results described above, particularly, the effects of the present invention are evident, and the effects are exhibited by mobile terminals which can be seen from anywhere such as tablet PCs or smartphones which have been spreading.

EXPLANATION OF REFERENCES

10: liquid crystal display device
12: viewing angle control film
14: liquid crystal display
18: first polarizer
20: first phase difference plate
20A: patterned optical anisotropic layer
20B: support
20a, 20b: belt-like region
24: second phase difference plate
24A: patterned optical anisotropic layer
24B: support
24a, 24b: belt-like region
26: second polarizer
28: bonding layer
30: movable stage
32: light screen
34: linearly polarizing plate

What is claimed is:
1. A viewing angle control film comprising, in order:
a first polarizer in which an absorption axis is in a direction perpendicular to a film surface;
a first phase difference plate which is a λ/4 plate and has a patterned optical anisotropic layer; and
a second phase difference plate which is a λ/4 plate and has a patterned optical anisotropic layer,
wherein the patterned optical anisotropic layer of the first phase difference plate and the patterned optical anisotropic layer of the second phase difference plate each have a constant phase difference and are divided into a plurality of belt-like regions in the same plane,
directions of slow axes in one belt-like region are the same as each other and directions of slow axes of belt-like regions adjacent to each other are different from each other in each of the patterned optical anisotropic layer of the first phase difference plate and the patterned optical anisotropic layer of the second phase difference plate, and
the belt-like region of the patterned optical anisotropic layer of the first phase difference plate and the belt-like region of the patterned optical anisotropic layer of the second phase difference plate are disposed so as to intersect with each other in a plane direction.

2. The viewing angle control film according to claim 1, wherein, in each of the patterned optical anisotropic layer of the first phase difference plate and the patterned optical anisotropic layer of the second phase difference plate, the directions of the slow axes of the belt-like regions adjacent to each other are orthogonal to each other.

3. The viewing angle control film according to claim 1, wherein the belt-like region of the patterned optical anisotropic layer of the first phase difference plate and the belt-like region of the patterned optical anisotropic layer of the second phase difference plate are orthogonal to each other in the plane direction.

4. The viewing angle control film according to claim 2, wherein the belt-like region of the patterned optical anisotropic layer of the first phase difference plate and the belt-like region of the patterned optical anisotropic layer of the second phase difference plate are orthogonal to each other in the plane direction.

5. The viewing angle control film according to claim 1, wherein the patterned optical anisotropic layer of the first phase difference plate and the patterned optical anisotropic layer of the second phase difference plate contain a rod-like liquid crystalline compound or a discotic liquid crystalline compound.

6. The viewing angle control film according to claim 1, wherein wavelength characteristics of the patterned optical anisotropic layer of the first phase difference plate and the patterned optical anisotropic layer of the second phase difference plate are inverse dispersion.

7. The viewing angle control film according to claim 1, wherein the first polarizer has a birefringent material, the birefringent material is a liquid crystalline compound, and
the viewing angle control film has a structure in which the liquid crystalline compound is vertically aligned.

8. The viewing angle control film according to claim 7, wherein the first polarizer has a dichroic coloring material.

9. The viewing angle control film according to claim 1, wherein a width of the belt-like region of the patterned optical anisotropic layer of the first phase difference plate and a width of the belt-like region of the patterned optical anisotropic layer of the second phase difference plate are each in a range of 1 mm to 100 mm.

10. The viewing angle control film according to claim 2, wherein a width of the belt-like region of the patterned optical anisotropic layer of the first phase difference plate and a width of the belt-like region of the patterned optical anisotropic layer of the second phase difference plate are each in a range of 1 mm to 100 mm.

11. The viewing angle control film according to claim 3, wherein a width of the belt-like region of the patterned optical anisotropic layer of the first phase difference plate and a width of the belt-like region of the patterned optical anisotropic layer of the second phase difference plate are each in a range of 1 mm to 100 mm.

12. The viewing angle control film according to claim 4, wherein a width of the belt-like region of the patterned optical anisotropic layer of the first phase difference plate and a width of the belt-like region of the patterned optical anisotropic layer of the second phase difference plate are each in a range of 1 mm to 100 mm.

13. An image display device comprising:
an image display element which includes a second polarizer in which an absorption axis is in a horizontal direction with respect to a film surface; and
the viewing angle control film according to claim 1, wherein the viewing angle control film is disposed such that the second phase difference plate side faces the image display element.

* * * * *